(12) United States Patent
Gupta et al.

(10) Patent No.: US 10,674,205 B2
(45) Date of Patent: Jun. 2, 2020

(54) METHODS AND SYSTEMS FOR SELECTING A PREFERRED VIEWPOINT FOR MEDIA ASSETS

(71) Applicant: Rovi Guides, Inc., Santa Clara, CA (US)

(72) Inventors: Ajay Gupta, Andover, MA (US); Sai Rahul Pulikunta, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 132 days.

(21) Appl. No.: 14/944,163

(22) Filed: Nov. 17, 2015

(65) Prior Publication Data

US 2017/0142480 A1 May 18, 2017

(51) Int. Cl.
| | |
|---|---|
| *H04N 21/4402* | (2011.01) |
| *H04N 21/218* | (2011.01) |
| *H04N 21/458* | (2011.01) |
| *H04N 21/44* | (2011.01) |
| *H04N 21/475* | (2011.01) |
| *H04N 21/466* | (2011.01) |
| *H04N 21/45* | (2011.01) |
| *H04N 21/442* | (2011.01) |
| *H04N 13/00* | (2018.01) |

(Continued)

(52) U.S. Cl.
CPC ....... *H04N 21/44029* (2013.01); *H04N 13/00* (2013.01); *H04N 13/117* (2018.05); *H04N 13/156* (2018.05); *H04N 13/167* (2018.05); *H04N 13/194* (2018.05); *H04N 13/232* (2018.05); *H04N 21/21805* (2013.01); *H04N 21/44016* (2013.01); *H04N 21/44222* (2013.01); *H04N 21/458* (2013.01); *H04N 21/4532* (2013.01); *H04N 21/4667* (2013.01); *H04N 21/4755* (2013.01)

(58) Field of Classification Search
CPC .......... H04N 2005/44547; H04N 2005/44556; H04N 2005/44565; H04N 5/44543
See application file for complete search history.

(56) References Cited

U.S. PATENT DOCUMENTS

| | | | |
|---|---|---|---|
| 9,070,050 B2 | 6/2015 | Grefalda et al. | |
| 2006/0282785 A1* | 12/2006 | McCarthy | G06T 1/00 715/760 |

(Continued)

OTHER PUBLICATIONS

Collet et al. "High-Quality Steamable Free-Viewpoint Video," Microsoft Corporation, ACM Transactions on Graphics, vol. 34, No. 4, Article 69, Publication Date Aug. 2015 (13 pages).

(Continued)

*Primary Examiner* — Anthony Bantamoi
(74) *Attorney, Agent, or Firm* — Haley Guiliano LLP

(57) ABSTRACT

Methods and systems are provided for a media guidance application that customizes media content based on the preferences of a user. In particular, the media guidance application may select a particular viewpoint from which to present the media content to the user. In such cases, the media guidance application may select a particular camera angle from which to display the media content (e.g., when media content is available from multiple camera angles), may create a particular camera angle using data received from a plurality of cameras (e.g., when media content is presented in a free viewpoint environment), or select a particular object to focus on (e.g., when the media content is captured using a plenoptic camera).

20 Claims, 8 Drawing Sheets

(51) Int. Cl.
  *H04N 13/194* (2018.01)
  *H04N 13/232* (2018.01)
  *H04N 13/156* (2018.01)
  *H04N 13/117* (2018.01)
  *H04N 13/167* (2018.01)

(56) References Cited

U.S. PATENT DOCUMENTS

| | | | | |
|---|---|---|---|---|
| 2007/0240183 | A1* | 10/2007 | Garbow | H04N 7/163 725/38 |
| 2010/0225735 | A1* | 9/2010 | Shaffer | G06F 3/012 348/14.08 |
| 2012/0098925 | A1* | 4/2012 | Dasher | H04N 5/247 348/36 |
| 2015/0009278 | A1* | 1/2015 | Modai | H04N 7/15 348/14.08 |
| 2017/0099441 | A1* | 4/2017 | Choi | H04N 5/247 |

OTHER PUBLICATIONS

Dr.-Ing. and Aljoscha Smolic 3D Video and Free Viewpoint Video—Technologies, Applications and MPEG Standards 2007 (88 pages).

Masayuki Tanimoto "APSIPA Transactions on Signal and Information Processing," vol. 1, Published online Sep. 5, 2012 (15 pages).

Aljoscha Smolic "3D Video and Free Viewpoint Video—From Capture to Display," available online Sep. 15, 2010 (11 pages).

Carranza et al. "Free-Viewpoint Video of Human Actors," 2003 (9 pages).

Miller et al. "Interactive Free-Viewpoint Video" Centre for Vision, Speech and Signal Processing conference date Sep. 30, 2013-Oct. 2, 2013 (10 pages).

Goldlucke et al. "Real-Time, Free-Viewpoint Video Rendering from Volumeric Geometry," Jun. 16, 2003 (7 pages).

* cited by examiner

600

```
600 ...
601 Initialization Subroutine
602 ...
603 //Routine to generate, based on an available video stream, a video stream that
    corresponds to a camera angle when a media asset is consumed:
604
605  Receive instances of camera angle of an available video stream
606  For each instance of camera angle of an available video stream:
607    A = Accessed value of the camera angle of the available video stream
608    B = Accessed value of a corresponding camera angle
609        If (Abs(A-B)<=tolerance)
610            Execute subroutine to generate a video stream based on the
               available video stream whose value of the camera angle matches
               the value of the corresponding camera angle
611            Exit iteration loop
612  ...
613   Termination Subroutine
614  ...
```

```
800 ...
801 Initialization Subroutine
802 ...
803 //Routine to search a first database to retrieve camera angles that correspond to
        preferred viewpoints when a media asset is consumed
804
805   Receive instances of camera angle that corresponds to a preferred viewpoint
806   For each instance of camera angle that corresponds to a preferred viewpoint:
807       Query database containing camera angles of available video streams for any
          entry matching the camera angle that corresponds to the preferred viewpoint
808       If (Number of matching entries > 0)
809           Execute subroutine to generate a video stream based on the available
              video stream whose camera angle matches the camera angle that
              corresponds to the preferred viewpoint
810 ...
811 Termination Subroutine
812 ...
```

FIG. 8

METHODS AND SYSTEMS FOR SELECTING A PREFERRED VIEWPOINT FOR MEDIA ASSETS

BACKGROUND

In conventional systems, users have access to a plethora of media content. With so much media content available, content providers are constantly searching for a way to distinguish their media content from media content provided by other content providers.

SUMMARY

Accordingly, methods and systems are provided herein for a media guidance application that customizes media content based on the preferences of a user. In particular, the media guidance application may select a particular viewpoint from which to present the media content to the user. In such cases, the media guidance application may select a particular camera angle from which to display the media content (e.g., when media content is available from multiple camera angles), may create a particular camera angle using data received from a plurality of cameras (e.g., when media content is presented in a free viewpoint environment), or select a particular object to focus on (e.g., when the media content is captured using a plenoptic camera). Furthermore, the media guidance application may monitor the way (e.g., the particular camera angle used) that a user typically consumes media content and automatically offer the media content in that way. By presenting the media content in a particular way based on a user preference, the media guidance application increases the viewing experience of the user and adds value to the media content. Accordingly, users are more likely to consume the respective media content as opposed to other media content.

In some aspects, the media guidance application may determine a preferred viewpoint of a user for a media asset. For example, if the user prefers to view baseball games from behind home plate, the media guidance application determines that behind home plate is the preferred viewpoint. The media guidance application may use various methods to determining the preferred viewpoint. For example, the media guidance application may retrieve a user profile that indicates previous viewpoints used by the user, rank the previous viewpoints based on a number of instances, the length of time, etc. that the user has used each of the previous viewpoints, and select a previous viewpoint as the preferred viewpoint based on the ranking. Accordingly, the media asset is customized to the preferences of the user and the viewing experience is increased.

For example, the media guidance application may determine a preferred viewpoint of a user by ranking all of the previous viewpoints of a group of users. The ranking may be based on an aggregated number of instances or an aggregated length of time that the users have used each of the previous viewpoints.

The media guidance application may also determine a preferred viewpoint of a user by continuously learning and analyzing the viewing behaviors of the user based on the user profile that constantly accumulates information related to the user's viewing patterns over time.

The media guidance application may determine a camera angle that corresponds to the preferred viewpoint. For example, the preferred viewpoint (e.g., behind home plate) may correspond to a particular set of angles relative to an object (e.g., a pitcher's mound). In some embodiments, the media guidance application may access specialized databases to determine the camera angle. For example, the media guidance application may input the preferred viewpoint into a database listing locations corresponding to preferred viewpoints to determine a location (e.g., a geographic coordinate) corresponding to the preferred viewpoint and input the location corresponding to the preferred viewpoint into a database listing camera angles corresponding to locations to determine the camera angle that corresponds to the preferred viewpoint. By selecting a particular camera angle, the media guidance application can ensure that the user accesses the media asset from the preferred viewpoint.

The media guidance application may retrieve a list of camera angles of available video streams. For example, the media guidance application may select a camera angle from a various available camera angles. To do so, the media guidance application may first need to identify what camera angles are available for the media asset.

The media guidance application may determine a plurality of video streams of the available video streams for use in generating a video stream that corresponds to the camera angle. For example, the video stream may be a multiview video, and the media guidance application may generate a composite image based on data from the plurality of video streams. Accordingly, the media guidance application may need to select particular video streams (e.g., corresponding to particular camera angles) in order to generate a composite image in which the image presented to the user has the preferred viewpoint. For example, the media guidance application may generate a model of an object (e.g., a pitcher's mound) based on the plurality of video streams, select a portion (e.g., a portion as viewed from a particular viewpoint) of the model that corresponds to the camera angle, and generate for display the video stream based on the portion.

The media guidance application may generate for display the video stream based on the plurality of video streams. For example, the media guidance application may present a media asset that allows a user to input a preferred viewpoint for a non-live broadcast or recorded program, and the media guidance application may change the viewpoint from which the user consumes the media asset.

For example, the media guidance application may receive a preferred viewpoint that is determined based on a user input received after the media asset has been entirely recorded. As another example, the media guidance application may receive a user input requesting a new viewpoint while generating for display the video stream, determine a new camera angle that corresponds to the new viewpoint, retrieve the list of camera angles of available video streams, determine a new plurality of video streams of the available video streams for use in generating a new video stream that corresponds to the new camera angle, and generate for display the new video stream based on the new plurality of video streams. Thus, the media guidance application creates a 3D, virtual environment in which a user may freely customize the viewpoints from which the user accesses media content.

It should be noted that the systems, methods, apparatuses, and/or aspects described above may be applied to, or used in accordance with, other systems, methods, apparatuses, and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is pseudocode of illustrative steps for generating a video stream that corresponds to a camera angle in accordance with some embodiments of the disclosure;

FIG. 8 is pseudocode of an illustrative process for generating a video stream that corresponds to a camera angle corresponding to a preferred viewpoint in accordance with some embodiments of the disclosure;

DETAILED DESCRIPTION

Figure 1:
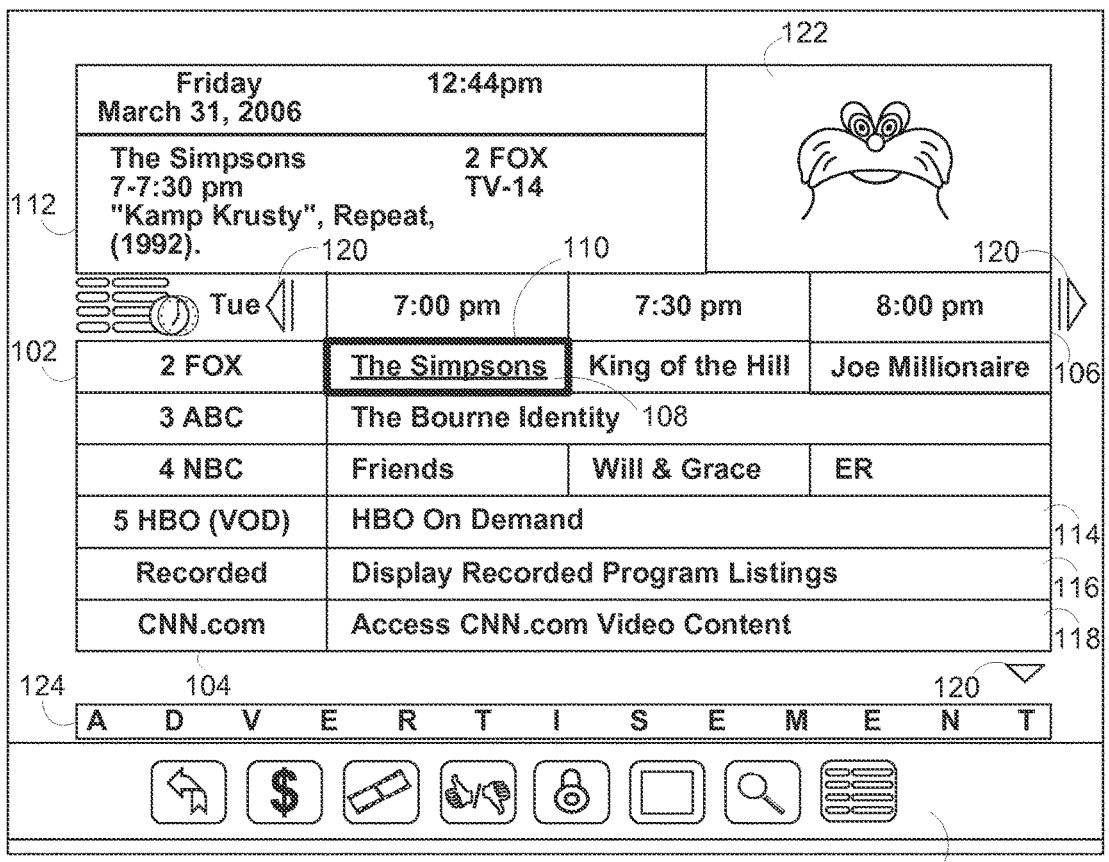
FIG. 1 shows an illustrative example of a display screen generated by a media guidance application in accordance with some embodiments of the disclosure.

Methods and systems are disclosed herein for a media guidance application that customizes media content based on the preferences of a user. As discussed herein, the media guidance application may select a particular viewpoint from which to present the media content to the user. Such a selection of a particular viewpoint may be achieved through one or more ways.

For example, to determine a particular viewpoint, the media guidance application may select a particular camera angle among a variety of camera angles. The media guidance application may also create a particular camera angle using data received from a plurality of cameras in a free-viewpoint ("FVP") environment. For example, the media guidance application may also select a particular object to focus on when the media content is captured using a plenoptic camera. Furthermore, the media guidance application may monitor the way (e.g., the particular camera angle used) that a user typically consumes media content and automatically offer the media content in that way.

In a free-viewpoint environment, a user may interactively choose his viewpoint from those available viewpoints of the received free-viewpoint video. For example, by being able to choose his viewpoint to view the video, the user may be able to better enjoy and observe the actions of a dynamic scene or object. For example, free-viewpoint video may allow real-world events presented to a user in a more engaging or interesting way. As another example, free-viewpoint video may enhance a videogame player's experience and enjoyment games when scenes or objects in a videogame are presented in free-viewpoint environment. A user may better enjoy a media asset in a free-viewpoint environment because he has interactive control of viewpoints. Further, based on a viewpoint selected by the user, a media guidance application may determine that is the current preferred viewpoint of the user, and then determine a camera angle that corresponds to that selected viewpoint, and generate a video stream that corresponds to that camera angle. Free-viewpoint video, its technologies and functionalities are described in greater detail in, for example, Tanimoto, *FTV (free-viewpoint television)*, APSIPA Transactions on Signal and Information Processing/Volume 1/2012/e4 (Sep. 5, 2012) (published online), available at http://journals.cambridge.org/action/displayAbstract?fromPage=online&aid=8688776&fileId=S2048770312000054, Collet et al., *High-Quality Streamable Free-Viewpoint Video*, ACM Trans. Graph. 34, 4, Article 69 (August 2015), available at http://doi.acm.org/10.1145/2766945, Smolic, *3D Video and Free Viewpoint Video—From capture to Display*, Pattern Recognition 44 (2011)1958-1968, available at http://www.disneyresearch.com/publication/3d-video-and-free-viewpoint-video-from-capture-to-display, Smolic, *3D Video and Free Viewpoint Video—Technologies, Applications and MPEG Standards*, 2007, available at http://vca.ele.tue.nl/events/3Dworkshop2006/pdf/Aljosch aSmolic.pdf, Carranza et al., *Free-Viewpoint Video of Human Actors*, ACM Transactions on Graphics (TOG)—Proceedings of ACM SIGGRAPH 2003 TOG, Volume 22 Issue 3 (July 2003), Pages 569-577, available at http://dl.acm.org/citation.cfm?id=882309, Miller et al., Interactive Free-Viewpoint Video, presented at the Conference on Visual Media Production, 2005, available at http://epubs.surrey.ac.uk/110790/2/miller05cvmp.pdf, Goldlucke et al., *Real-time, Free-viewpoint Video Rendering from Volumetric Geometry*, Proc. SPIE 5150, Visual Communications and Image Processing 2003, available at https://vision.in.tum.de/_media/spezial/bib/gm03_fvr.pd f., which are hereby incorporated by reference herein in their entireties.

The presentation of a plenoptic media asset may provide a user with the ability to choose a viewpoint with a better focus on a particular scene or object. For example, the presentation of a plenoptic media asset may provide a user with customized and enhanced viewing experience during an action movie by providing an increased focus on a desired movie scene or object, and may allow the user to more easily follow the development of the desired movie scene or the movement of the desired object. Further, a plenoptic video may be captured using a plenoptic camera. Plenoptic cameras and their technologies and functionalities are described in greater detail in, for example, Grefalda et al. U.S. Pat. No. 9,070,050, issued Jun. 30, 2015, which is hereby incorporated by reference herein in its entirety.

By presenting the media content in a particular way based on a user preference, the media guidance application increases the viewing experience and pleasure of the user and adds value to the media content as a particular selected viewpoint may be more enjoyable or engaging for a particular user when he or she consumes media content. Accordingly, that user may be more likely to consume that media content presented based on a user preference as opposed to other media content.

The amount of content available to users in any given content delivery system can be substantial. Consequently, many users desire a form of media guidance through an interface that allows users to efficiently navigate content selections and easily identify content that they may desire. An application that provides such guidance is referred to herein as an "interactive media guidance application" or, sometimes, a "media guidance application" or a "guidance application."

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" should be understood to mean an electronically consumable asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. A media asset may be a live broadcast such as a live baseball game program. A media asset may also be a non-live broadcast such as an on-demand movie.

As referred to herein, a "viewpoint" may be a point of view or a vantage point (e.g., a chair in a sports stadium) for viewing a scene or an object. A viewpoint may also be a place (e.g., a press box in a sports stadium) from which a user would like to view a scene or an object in a media asset. Such a media asset may, for example, include both visual and audio components. Such a media asset may also be purely visual (e.g., scenery photos). Such a media asset may also be purely audio (e.g., music).

For example, during a sports game (e.g., a baseball game), a viewpoint may be a location at which a user would watch or observe a live game. Such a location may be a vantage point such as the home plate in a baseball field. The location may also be a place such as a corporate suite inside a stadium.

A viewpoint may be defined using a set of geographical location coordinates. For example, a viewpoint may be determined using a three-dimensional Cartesian coordinate system (XYZ coordinate system). A viewpoint may also be determined using a polar coordinate system. A viewpoint may also be a position that is defined relative to another position. For example, during a baseball game, the coordinates (e.g., XYZ coordinates) of a viewpoint may be determined relative to the home plate in the baseball field. The home plate in that case may or may not be the origin of the coordinate system in which the viewpoint is located. For example, a viewpoint may also be a position that is defined relative to another object. For example, in a baseball game, a viewpoint's coordinates (e.g., XYZ coordinates) may be determined with respect to the coordinates of the ball catcher in the game. A viewpoint may also be a position that is defined relative to an object that moves. For example, in a baseball game, a viewpoint's coordinates (e.g., XYZ coordinates) may be defined with respect to the coordinates of the shortstop player who moves in the baseball field.

A viewpoint may also be the position from which the user can maximize his viewing experience. Such a viewpoint may be determined by, for example, information about the user's past viewing behaviors. Such a viewpoint may also be determined by, for example, information collected from other similarly situated users. Such information may come from social media or databases.

Moreover, a viewpoint may also be static or dynamic. A static viewpoint may be based on a location that is fixed (e.g., the home plate of a baseball field). A dynamic viewpoint may be based on a location that varies. For example, a dynamic viewpoint may be determined based on where the pitcher stands, and may therefore change as the pitcher may move during a baseball game. A dynamic viewpoint may also be determined based upon the progress or stage of the game. For example, during an NFL football game, a viewpoint that tracks the quarterback player in action may be dynamic. In that case, the dynamic viewpoint may constantly be updated by moving to a different position that corresponds to a different yard line that is closest to the quarterback player. Furthermore, a dynamic viewpoint may also be based on the line of gaze of a particular person (e.g., the pitcher's line of sight). In that case, as that particular person looks in different directions by, for example, turning his head or rolling his eyeballs, a dynamic viewpoint dependent on the line of gaze of that person may be adjusted accordingly.

Further, there may be multiple viewpoints associated with one single physical location from which a user consumes a media asset. For example, the physical location from which a user watches a basketball game may be at the center of the sideline where the player benches are situated. However, this physical location may offer multiple viewpoints. One possible viewpoint may be a viewpoint that provides a field of view that is directly toward the player currently in possession of the ball. Another possible viewpoint may be a viewpoint that provides a field of view that is directly toward a star player who is not currently in possession of the ball.

Moreover, the media guidance application may create a viewpoint that is virtual. A virtual viewpoint does not exist physically but is created by using, for example, data associated with existing viewpoints that may be physical or virtual. Such data may include information on physical viewpoints provided by the plurality of cameras. A virtual viewpoint may become part of a database of viewpoints that are available to a user, and may be selected for the user as a preferred viewpoint to consume a media asset. Further, every existing or virtual viewpoint may be saved and catalogued in a database and/or a user profile.

As referred to herein, a "preferred viewpoint" may be a viewpoint that is enjoyed by a user more than other viewpoints. A preferred viewpoint may be a favorite viewpoint of a user who consumes a media asset. A preferred viewpoint may also be the viewpoint that a particular user has most frequently used (e.g., based on a ranking of the numbers of previous uses of the viewpoints) to consume a media asset. Additionally, a preferred viewpoint may also be the viewpoint that a particular user has used for the longest total time duration (e.g., based on a ranking of the total time durations spent on using the viewpoints). A preferred viewpoint may further be a viewpoint that is more desirable than certain other viewpoints for a particular user. For example, such a desirable viewpoint may be the closest viewpoint from which the user can observe a star athlete. A preferred viewpoint may also be a viewpoint that has more value or benefit than certain other viewpoints. For example, during a televised debate, such a more valuable or beneficial viewpoint may be a viewpoint from which a user can observe simultaneously two debaters who are exchanging arguments. Moreover, a preferred viewpoint may also be a viewpoint that is given priority or precedence over certain other viewpoints. For example, during a televised basketball game, a viewpoint that is given priority or precedence over certain other viewpoints may be a viewpoint from which a user may observe the player currently in possession of the ball.

The media guidance application may determine a preferred viewpoint of a user based on information collected about a user. For example, based on the viewing history information of a particular user, the media guidance application may determine that user's preferred viewpoint for a particular program. Additionally or alternatively, the media guidance application may also determine a preferred viewpoint based on a manual user input. Further, a preferred viewpoint may also change during the course of the presentation of a media asset. For example, the preferred viewpoint for a soccer game during the first half of the game may be from the position behind one of the goal lines. However, the preferred viewpoint may change to the position behind the other goal line during the second half of the second. Further, every existing or virtual preferred viewpoint may be saved and catalogued in a database and/or a user profile.

The media guidance application may also determine a preferred viewpoint of a user based on information collected about multiple users. For example, based on all of the previous viewpoints utilized by a group of users for a particular media asset, the media guidance application may also determine a preferred viewpoint of a user by ranking the all of these previous viewpoints of the group of users. The ranking may be based on an aggregated number of instances that the users have used each of the previous viewpoints. Alternatively, the ranking may be based on an aggregated length of time that the users have used each of the previous viewpoints.

The media guidance application may determine a preferred viewpoint of a user based on continuous learning about the user's viewing patterns or history. For example, one factor that the media guidance application may use to determine the preferred viewpoint is to evaluate whether a particular choice of viewpoint has been previously accepted or rejected by the user. The media guidance application may then incorporate this information about whether a particular viewpoint has been previously accepted or rejected into a user profile so that the user profile is augmented. The media guidance application may continuously incorporate such information into the user profile over time such that the user profile may expand continuously as it accumulates information.

In some embodiments, the media guidance application may determine a preferred viewpoint of a user by analyzing viewing behaviors of the user using the information from the user profile, which may expand over time. For example, based on the determined highest ranked viewpoint (e.g., viewing the front of a player from the far baseline) of a user for a tennis match, the media guidance application may deduce and determine that the same viewpoint should be the preferred viewpoint of a user for a badminton match. As another example, the media guidance application may determine from a user profile that the user has rejected, on three prior occasions, a particular viewpoint for a basketball game played inside a particular stadium. Based on this behavior, the media guidance application may determine that this particular viewpoint should not be the user's preferred viewpoint for any future basketball played in the same stadium. Further, by analyzing this behavior, the media guidance application may also determine that this particular viewpoint also should not be the preferred viewpoint for the same user for viewing any hockey game played in the same stadium.

In some other embodiments, the media guidance application may determine a preferred viewpoint of a user by analyzing more than one factors or considerations such as those described above.

As referred to herein, a "camera angle" may be an angle by which the camera has deviated from a certain reference frame defined for a particular camera. A camera angle may be measured in a two-dimensional coordinate system. In that case, a camera angle can be of any degree, including the zero degree, measured in a two-dimensional coordinate system. A camera angle may be measured based on the number of degrees between the line of sight of the camera and the defined reference frame (e.g., a reference horizontal line). Further, a camera angle may be measured in a three-dimensional coordinate system. In that case, a horizontal camera angle may be measured based on the number of degrees between the ground projection line of the line of sight of the camera and the defined horizontal reference frame (e.g., a reference horizontal line); a vertical camera angle may be measured based on the number of degrees between the line of sight of the camera and the defined vertical reference frame (e.g., a reference vertical line).

A camera angle may be determined in several ways. For example, various trigonometric functions may be employed to determine a camera angle in a two-dimensional coordinate system or a three-dimensional coordinate system. For example, for a camera that is aimed at the third baseman standing near the third base (with the line of sight being directed at his glove), in a three-dimensional coordinate system, a horizontal angle of that camera may be measured by the number of degrees between the ground projection line of the line of sight and a reference horizontal line (which passes through the camera, and is parallel with the top side of the home plate). For the example, under the "Pythagorean theorem," the ratio between the perpendicular distance from the third baseman to the reference horizontal line (the length of the "opposite side") and the ground projection distance of the line of sight from the third baseman to the camera (the "hypotenuse") is the "sine" of the horizontal angle of that camera. By taking the "inverse sine" or "arcsin" of this ratio, the value of the horizontal angle of that camera can be obtained. Additionally, the ratio between the ground projection distance of the line of sight from the third baseman to the camera (the length of the "adjacent side") and the length of the line of sight of the camera (the "hypotenuse") is the "cosine" of the vertical angle of that camera. By taking the "inverse cosine" or "arccosine" of this ratio, the value of the vertical angle of that camera can be obtained. As another example, the ratio between the distance from the glove of the third baseman to the ground (the length of the "opposite side") and the ground projection distance of the line of sight from the third baseman to the camera (the length of the "adjacent side") is the "tangent" of the vertical angle of that camera. By taking the "inverse tangent" or "arctangent" of this ratio, the value of the vertical angle of that camera can be obtained. Moreover, other trigonometric functions, such as the "Law of cosines" or the "Law of sines," may be used to calculate a camera angle.

Further, a camera angle may correspond to a preferred viewpoint. For example, a camera angle (e.g., provided by a camera at one of the four corners in a soccer field) that provides a direct line of gaze on an object (e.g., the player currently in possession of the ball) may correspond to a preferred viewpoint (e.g., a location from which the player currently in possession of the ball is directly observed). A camera angle that corresponds to a preferred viewpoint may also be determined from a database. For example, when a certain desired viewpoint is determined, a camera angle that best matches this desired viewpoint will be searched in a database, and determined from the available camera angles in a database.

A camera angle may not be an angle of a physical camera. A camera angle may be virtual, and created by using, for example, one or more existing camera angles. Further, every existing or virtual camera angle may be saved and catalogued in a database and/or a user profile.

In the case where the media guidance application determines that a particular camera angle corresponds to a preferred viewpoint, that camera may or may not be physically situated at that viewpoint. For example, a preferred viewpoint may be a location behind the home plate of a baseball field and provide a field of view toward the pitcher's mound. A camera that provides a camera angle that corresponds to this preferred viewpoint may not be situated behind the home plate, but may rather be situated near the third base of the baseball field. In that case, the camera that provides the camera angle that corresponds to the preferred viewpoint may be configured (e.g., by physically turning) to provide a field of view toward the pitcher's mound.

Further, in a free-viewpoint environment, multiple camera angles associated with a scene or object may be available. The media guidance application may retrieve a list of all camera angles associated with all of the available video streams that are available from a free-viewpoint video received. As an example, a baseball game presentation may be transmitted as a free-viewpoint video that contains three video streams, each of which is associated with a different camera angle. For example, the first video stream is associated with a camera angle that corresponds to a viewpoint from behind the home plate, the second video stream is associated with a camera angle that corresponds to a viewpoint from behind the first base, and the third video stream is associated with a camera angle that corresponds to a viewpoint from behind the third base.

Further, a camera angle may correspond to one or more preferred viewpoints. For example, at a particular given time, a camera angle is providing a field of view directly toward a star player who is currently in possession of the ball during a basketball game. This camera angle may correspond to a preferred viewpoint from which a user desires to observe the star player. Additionally, this camera angle may correspond to a preferred viewpoint from which a user desires to observe any player who is currently in possession of the ball during the game. As another example, a camera angle is providing a field of view directly toward the catcher and, also at the same time, the umpire who is behind the catcher in a baseball game. This camera angle may correspond to a preferred viewpoint from which a user desires to observe the catcher.

Additionally, this camera angle may correspond to a preferred viewpoint from which a user desires to observe the reactions of the umpire.

A preferred viewpoint may be provided by one or more camera angles. For example, a user's preferred viewpoint may be a place located at the midpoint of a sideline of a basketball court, and also provide a field of view directly toward the ball. This preferred viewpoint may be provided by a camera angle of a camera situated at the midpoint of a sideline where the player benches are located, and also by a camera angle of another camera that is situated at the midpoint of the other sideline of the basketball court. Each of these camera angles may correspond to this preferred viewpoint.

By selecting a particular camera angle that corresponds to a preferred viewpoint, the media guidance application can ensure that the user accesses a media asset from a preferred viewpoint. As a result, the user's viewing pleasure may be increased, and the media asset or similar media asset presented using the same camera angle that corresponds to the preferred viewpoint may attract the user more than other media assets.

As referred to herein, a "video stream" may be a flow of video data. A video stream may be transmitted by a sender and then received by a receiver. A video stream may be displayed to the receiver as it is received. A video stream may include both visual and audio components, and may be displayed using a screen for the visual component and stereo speakers for the audio component. A video stream may also include only a visual component without any audio component. A video stream may be transmitted in a digital signal form. Further, a video stream may also be transmitted in an analog signal form. Further, a video stream may be compressed or encoded in order to be transmitted (e.g., over the Internet; via a cable system) to a user of a media asset, and then uncompressed or decoded in order to be displayed (e.g., using the screen and speakers of a television) to a user.

A video stream may contain data of entirely recorded programs (e.g., a movie; a recorded hockey game that took place in the past). A video stream may also contain data of live broadcast programs (e.g., a soccer game). A video stream may also contain data associated with electronic games (e.g., videogames; computer games), or data of other visual and/or audio communications. Further, a video stream may contain data of video content that is physically captured (e.g., an action scene from a TV episode; a hockey game). A video stream may also contain data of video content that is not physically captured, but created (e.g., virtual video content; computer-generated video content; simulated video contention). Further, a video stream may be two-dimensional or three-dimensional.

In a free-viewpoint environment, a free-viewpoint video may contain one or more video streams. For example, a free-viewpoint video of a live soccer game presentation received by a user may contain four video streams. In that case, each video stream may be captured at the location corresponding to the midpoint of each of the four sidelines of the soccer field.

As referred to herein, a "composite image" may be a generated image based on other images. A media guidance application may generate a composite image based on data from multiple video streams. A composite image may present a preferred viewpoint of a user. A composite image may be presented as one single image with added or modified elements from some other images. Further, a composite image may be two-dimensional or three-dimensional.

As referred to herein, a "user profile" refers to a collection of information about a particular user. The information may include information needed to determine the viewpoint preference of that user. The information may also include previous viewpoints used for that user. The information may further include educational, non-educational, professional, non-professional, and/or any other interest of a user. For example, the information contained in the user profile may include demographic, geographic, or other information about the user or a group to which the user belongs. In another example, the information about the user may be related to media content consumed by that user such as a viewing history, purchase history, recommendations, "liked" content, etc. In yet another example, the information may relate to activities of the user such as the current job, school, area of study, calendar information, etc. In yet another example, the information in the user profile may include responses from the user to queries about the user's interests.

As referred to herein, "multiview video" may be video that contains multiple views of the same scene or object. Multiview video may be captured using a system based on multiple cameras. Such multiple cameras may be synchronized and capable of simultaneously acquiring videos or images from different positions around the same scene or object. For example, multiview video may be three-dimensional ("3D") video. In that case, the user may receive multiple views of the same scene or object, and his brains may integrate the multiple views into a three-dimensional representation of the scene or object by simultaneously perceiving the slightly different views. For example, multiview video may also be free-viewpoint video. In a free-viewpoint point environment, a user can interactively select a viewpoint of a scene or object.

The media guidance application may determine a preferred viewpoint of a user for a media asset. For example, for a particular media asset being presented to a particular user, the media guidance application may perform a search through the user's profile that may contain data on all or some of the preferred viewpoints used by the user. Based on that search, the media guidance application may automatically determine, for example, that the preferred viewpoint is the viewpoint that the particular user used the most frequently in the past. Alternatively, the media guidance application may determine that the preferred viewpoint is the viewpoint that a particular user has used for the longest total time duration. As another example, the media guidance application may determine that the preferred viewpoint is the viewpoint that the user used for the last media asset consumed by the user. As a further example, the media guidance application may determine that the preferred viewpoint is the viewpoint that the user last used consecutively to view three media assets. As yet another example, the media guidance application may determine that the preferred viewpoint is the viewpoint that the user last used to view the same title of the media asset (e.g., the previous NHL hockey game that the user viewed).

In some embodiments, the media guidance application may determine a preferred viewpoint of a user for a media asset by utilizing pertinent information retrieved from a user profile, which may include data regarding the user's previous viewpoints, a ranking of the previous viewpoints based on the number of instances of usages or the length of total viewing time.

In some embodiments, the media guidance application may determine a preferred viewpoint of a user for a media asset based on user profiles of a group of users. For example, based on all of the previous viewpoints utilized by a group of users for a particular media asset, the media guidance application may also determine a preferred viewpoint of a user by ranking together all of these previous viewpoints of the group of users. For example, the ranking may be based on an aggregated number of instances that all users have used each of the previous viewpoints. In that case, the viewpoint that has been used for the most of the instances across all users may be determined by the media guidance application to be the preferred viewpoints for a particular user. Alternatively, the ranking may be based on an aggregated length of time that all users have used each of the previous viewpoints. In that case, the viewpoint that has been used for the longest, cumulative time period across all users may be determined by the media guidance application to be the preferred viewpoints for a particular user.

In some other embodiments, the media guidance application may determine a preferred viewpoint of a user by continuously learning about and analyzing a user's viewing patterns. For example, in determining a preferred viewpoint, the media guidance application may take into consideration whether a particular viewpoint has been explicitly accepted by the user for a media asset on any prior occasions. The media guidance application may also take into consideration whether a particular viewpoint has been explicitly rejected by the user for a media asset on any prior occasions. By incorporating the information on viewpoint acceptance or viewpoint rejection by the user into an existing user profile, the media guidance application may augment and expand the user profile such that it may cumulate valuable information and knowledge about the user's viewing behaviors. Using such a user profile that may be constantly updated, the media guidance application may utilize valuable information for subsequent determinations of the user's preferred viewpoints.

The media guidance application may determine the preferred viewpoint based on data mined from social media. For example, in the absence of any pertinent data from a user's profile, to determine the preferred viewpoint during a live boxing match, the media guidance application may determine the preferred viewpoint based on, for example, data gathered from a popular web forum dedicated to the sport of boxing. In that case, based on the pertinent data from the boxing web forum that are analyzed by the media guidance application, it may determine that the preferred viewpoint is from the position of the electronic display situated above the center of the boxing ring, as the data indicate that this viewpoint has been voted as most popular in the forum.

Moreover, the media guidance application may determine the preferred viewpoint based on, for example, the time of the day during which the media asset is being consumed. To illustrate, for a live daytime baseball game, the media guidance application may determine the preferred viewpoint by, for instance, taking into account the levels of glare caused by the sun and the current weather conditions (e.g., sunny; partly cloudy). In that case, the media guidance application may determine that the preferred viewpoint is one that is minimally affected by the glare caused by the sun during the daytime baseball game. However, when the media asset being consumed is a nighttime baseball game, the media guidance application may determine the preferred viewpoint by, for instance, taking into account the levels of darkness in some spots of the baseball stadium. In that case, the media guidance application may determine that the preferred viewpoint is one that provides the brightest picture to the user. In some embodiments, the media guidance application may determine the pertinent information about a particular media asset using data associated with that particular media asset, such as metadata. For example, a daytime baseball game program may be transmitted with its metadata that may include, for example, the current time of the game and weather conditions at the venue.

Additionally, the media guidance application may determine the preferred viewpoint based on, for example, the user's manual entry. In that case, the media guidance application may determine that the preferred viewpoint for the media asset currently being presented is the viewpoint specifically chosen by the user.

The media guidance application may determine a camera angle that corresponds to the preferred viewpoint. For example, a user's preferred viewpoint during a tennis match may be at the position that is ten feet behind the umpire of the match. Based on this preferred viewpoint, the media guidance application may determine that the corresponding camera angle is that of any camera that is located ten feet behind the umpire of the tennis match. As another example, a user's preferred viewpoint during a tennis match may be a viewpoint that provides a field of view that is directly toward the tennis racket held by his favorite player who is playing against the other player on the court. Thus, this is a dynamic viewpoint as the locations of the favorite player and his racket may constantly change. In that case, the dynamic viewpoint may constantly be updated by moving to a different position that provides the closest and clearest view of the racket. Based on this preferred viewpoint, the media guidance application may determine that the corresponding camera angle, at a given instance during the tennis match, is that of any camera that is physically located closest to the racket held by the favorite player and has an unobstructed view of the racket. In this example, the camera angle may also constantly change with the changing location of the racket as the match progresses.

In some embodiments, the media guidance application may access a database to determine the camera angle corresponding to the preferred viewpoint. For example, a database may contain a list of available camera angles corresponding to preferred viewpoints. The media guidance application may determine a camera angle corresponding to the preferred viewpoint by accessing the database and looking up the camera angle corresponding to the particular preferred viewpoint. In some other embodiments, under a free-viewpoint environment, the media guidance application may determine a camera angle that corresponds to the preferred viewpoint a user selects among those available viewpoints of free-viewpoint video.

In some other embodiments, the media guidance application may access specialized databases to determine the camera angle. For example, the media guidance application may first determine a location (e.g., by its geographic coordinates) corresponding to the preferred viewpoint by entering the information about the preferred viewpoint into a first database that contains a list of locations corresponding to preferred viewpoints. Then, the media guidance application may determine the camera angle that corresponds to the preferred viewpoint by entering the location corresponding to the preferred viewpoint into a second database that contains a list of camera angles corresponding to locations.

The media guidance application may retrieve a list of camera angles of available video streams. For example, a database of all available video streams along with the corresponding camera angles may exist. Each available video stream listed in the database may have one corresponding camera angle. The media guidance application may access the database to retrieve each available video stream and its corresponding camera angle. In the case of free-viewpoint video, the information on the available video streams associated with multiple views on the same scene or object, and the information on the camera angle corresponding to each available video stream, may be readily available to the media guidance application.

The media guidance application may then determine one or more video streams of the available video streams for use in generating a video stream that corresponds to the camera angle. For example, there may be a total of four available video streams captured for a soccer game that are received by the media guidance application, and the determined camera angle is that of the video camera that allows the viewer to see the field from one goal line to the other. Each of the four available video streams is captured using a camera that is located two feet behind the midpoint of each line of the soccer field. The media guidance application may determine that only the two video streams captured from behind the two goal lines are pertinent for generating a video stream that corresponds to the determined camera angle because only these two video streams captured the game action from one goal line to the other. In some embodiments, to generate a video stream to be displayed, the media guidance application may determine only one video stream from the available video streams for use in generating a video stream that corresponds to the camera angle. For instance, the media guidance application may determine that the video stream captured behind the home team's goal line is the only one for use in generating a video stream that corresponds to the determined camera angle.

The media guidance application may subsequently generate for display the video stream that corresponds to the determined camera angle based on the plurality of video streams. Continuing with the previous example, the media guidance application may analyze the two video streams captured from behind the goal lines, and then may generate a video stream that corresponds to the camera angle that allows the viewer to see the soccer field from one goal line to the other. To generate such a video stream to be displayed, the media guidance application may utilize the contents from both of these video streams captured from behind the goal lines. For instance, when the majority of the players on the soccer field are closer to the home team's goal line, the media guidance application may add to the video stream to be displayed content from the video stream captured from behind the home team's goal line. On the other hand, when the majority of the players on the soccer field are closer to the visiting team's goal line, the media guidance application may add to the video stream to be displayed content from the video stream captured from behind the visiting team's goal line.

In some embodiments, the video stream to be displayed may be virtual as it may be created by the media guidance application using existing video streams. For example, it may be possible that none of the existing video streams received by the media guidance application corresponds to the determined camera angle. However, the media guidance application may determine that one or more existing video streams may be used to generate a virtual video stream that corresponds to the determined camera angle. For example, the media guidance application may extract relevant portions of the existing video streams, and then combine the extracted portions to generate for display a virtual video stream that corresponds to the determined camera angle. Additionally, the media guidance application may generate for display a virtual video stream by extrapolation based on existing pertinent video streams. For example, the media guidance application may generate a virtual model of an object (e.g., a tennis court net) based on the existing video streams, select a portion (e.g., a portion of the tennis court net as viewed from a particular viewpoint) of the model that corresponds to the determined camera angle, and then generate for display a video stream based on that portion.

In some embodiments, while the media guidance application is generating for display a first video stream, it may receive a user entry that indicates a request for a new viewpoint. This new viewpoint may override the current viewpoint being used for the presentation of the media asset. In that case, the media guidance application may determine a new camera angle that corresponds to the new viewpoint by, for example, accessing a database that lists viewpoints with corresponding camera angles, as discussed above. The media guidance application may then retrieve a list of all of the camera angles of the available video streams that are received. Using one or more ways described above, the media guidance application may consequently determine a new plurality of video streams of the available video streams for use in generating a new video stream that corresponds to the new camera angle, and generate for display the new video stream based on the new plurality of video streams.

Thus, the media guidance application provides at least a multiview, three-dimensional, free-viewpoint, and virtual environment in which a consumer of media assets may freely customize the preferred viewpoints from which the consumer accesses media contents.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

Figure 2:
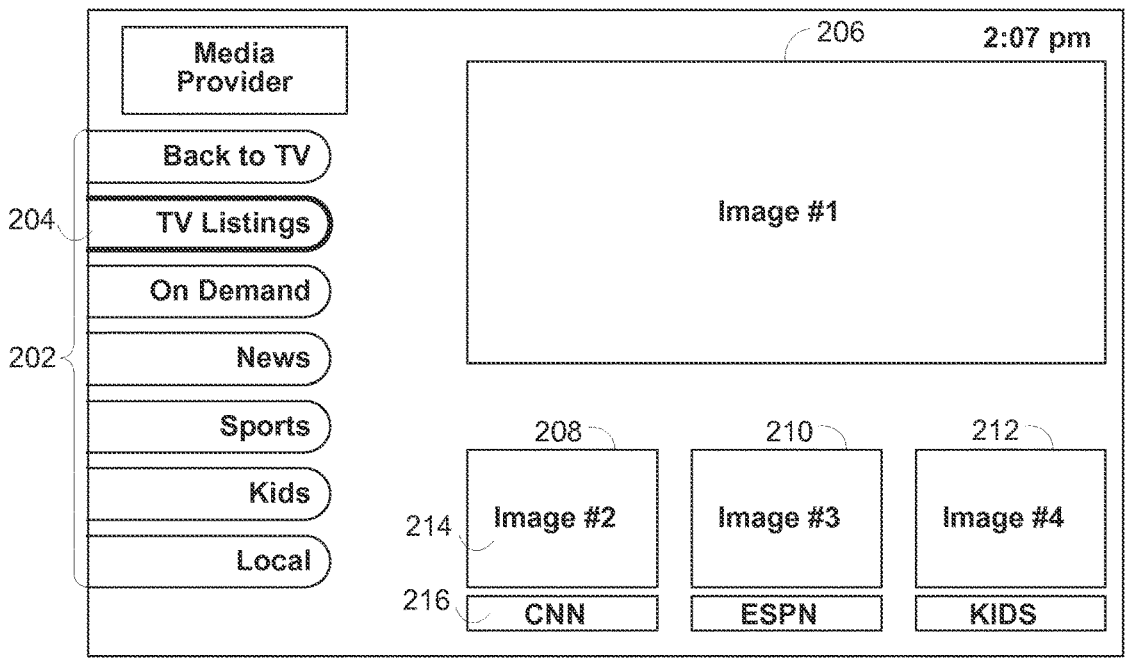
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
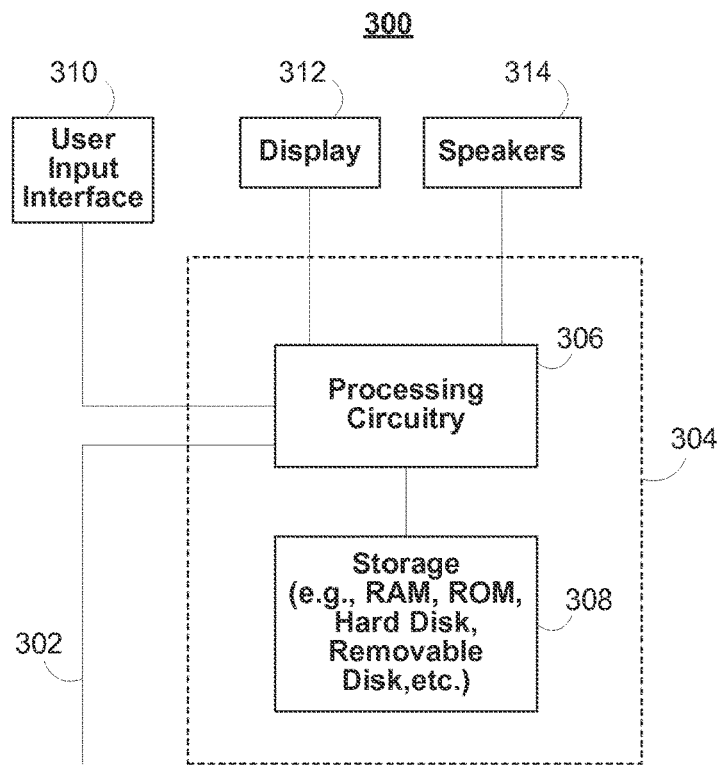
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
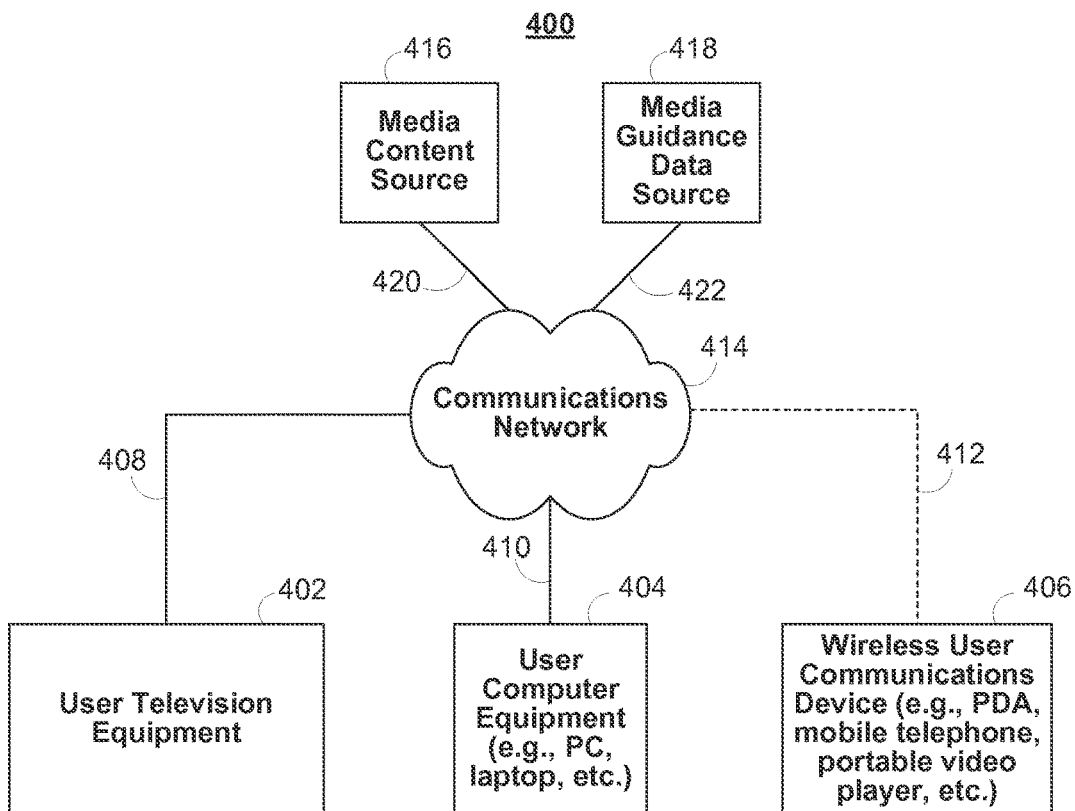
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred to herein, the term "in response to" refers to initiated as a result of. For example, a first action being performed in response to another action may include interstitial steps between the first action and the second action. As referred to herein, the term "directly in response to" refers to caused by. For example, a first action being performed directly in response to another action may not include interstitial steps between the first action and the second action.

Figure 5:
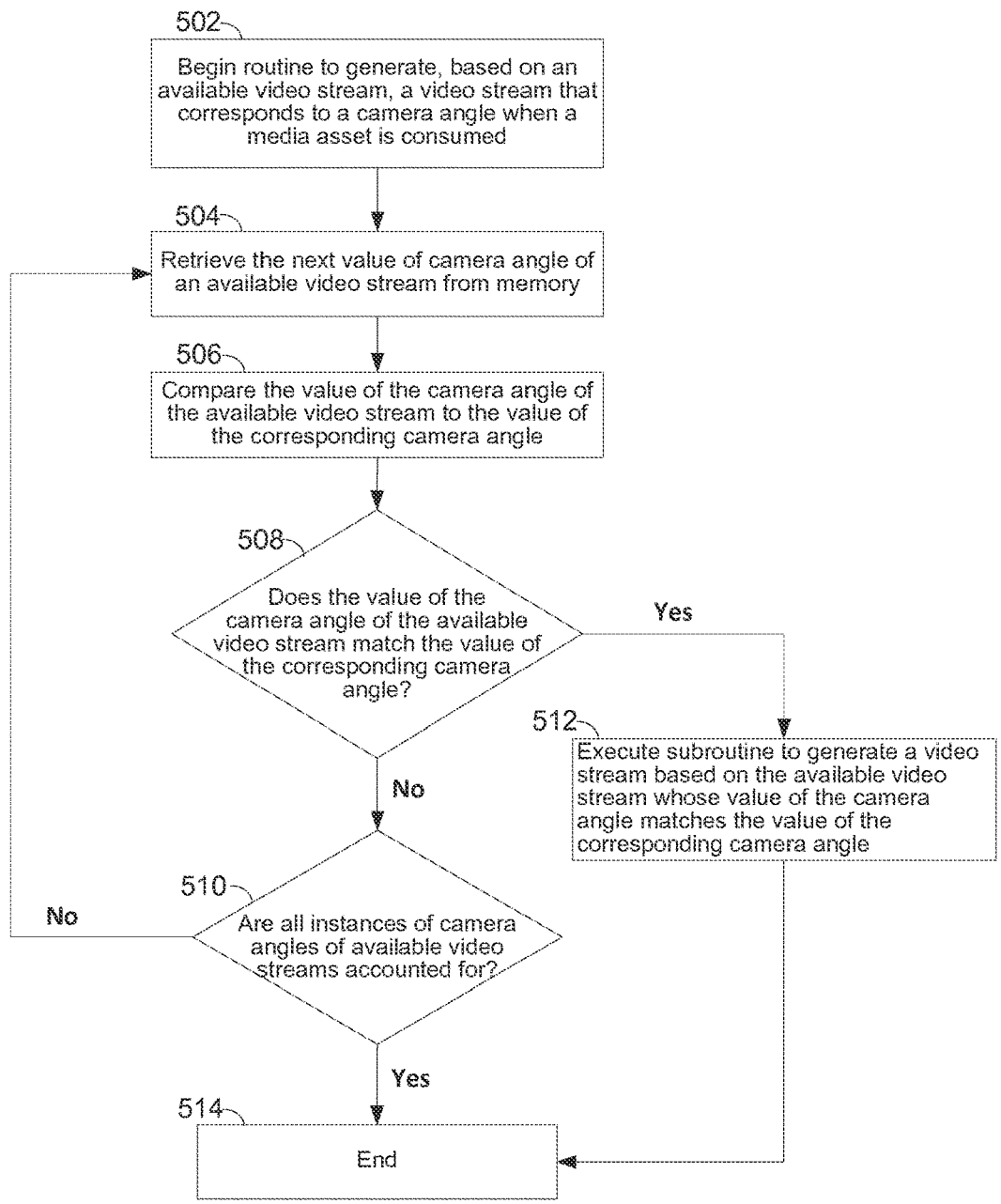
FIG. 5 is a flowchart of illustrative steps for generating a video stream that corresponds to a camera angle in accordance with some embodiments of the disclosure.

FIGS. 5 and 6 present a process for control circuitry (e.g., control circuitry 304) to generate, based on an available video stream, a video stream that corresponds to a camera angle (a "corresponding camera angle") in accordance with some embodiments of the invention. In some embodiments, process 500 may be encoded onto non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes a process implemented on control circuitry (e.g., control circuitry 304) to generate, based on an available video stream, a video stream that corresponds to a camera angle in accordance with some embodiments of the invention.

At step 502, the process to generate, based on an available video stream, a video stream that corresponds to a camera angle will begin when a media asset is consumed. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm his or her input using a display (e.g., by generating a prompt to be displayed on display 312) prior to running process 500.

At step 504, control circuitry 304 proceeds to retrieve the next value of camera angle of an available video stream from memory. In some embodiments control circuitry 304 may receive a single primitive data structure that represents the value of camera angle of an available video stream from memory. In some embodiments the value may be stored as part of a larger data structure, and control circuitry 304 may retrieve the value by executing appropriate accessor methods to retrieve the value from the larger data structure.

At step 506, control circuitry 304 proceeds to compare the value of the camera angle of the available video stream to the value of the corresponding camera angle. In some embodiments, the value of a camera angle of an available video stream may be stored (e.g., on storage device 308) prior to beginning the process. In some embodiments, the value of the corresponding camera angle may be updated. In some embodiments, control circuitry 304 may directly compare the value of a camera angle of an available video stream to the value of the corresponding camera angle by accessing the values respectively from memory and performing a value comparison. In some instances, control circuitry 304 may call a comparison function (e.g., for object to object comparison) to compare a corresponding camera angle and a camera angle of an available video stream.

At step 508, control circuitry 304 compares the value of the camera angle of the available video stream to the value of the corresponding camera angle to determine if there is match. If the condition of step 508 is satisfied, process 500 proceeds to step 512; if the condition is not satisfied, process 500 proceeds to step 510 instead.

At step 510, control circuitry 304 checks if all instances of camera angles of available video streams are accounted for. If all of the instances have been evaluated, control circuitry 304 proceeds to step 514. For example, control circuitry 304 may call a function to see if there is a next element of camera angle of an available video stream. If the function returns true (i.e., there are still instances that need to be processed), control circuitry 304 proceeds to step 504.

At step 512, control circuitry 304 executes a subroutine to generate a video stream based on the available video stream whose value of the camera angle matches the value of the corresponding camera angle if the condition at step 508 is satisfied. After the execution, the process will proceed to step 514.

At step 514, control circuitry 304 runs a termination subroutine after process 500 has performed its function.

It is contemplated that the descriptions of FIG. 5 may be used with any other embodiment of this invention. In addition, the descriptions described in relation to process 500 may be done in parallel to further the purposes of this invention. As an example, in some embodiments several instances of camera angle of an available video stream may be evaluated in parallel, using multiple logical processor threads, or process 500 may be enhanced by incorporating branch prediction. Furthermore, it should be noted that process 500 may be implemented on a combination of appropriately configured software and hardware, and that any of the devices or equipment discussed in relation to FIGS. 3-4 could be used to implement one or more portions of the process.

The pseudocode in FIG. 6 describes a process to generate, based on an available video stream, a video stream that corresponds to a camera angle when a media asset is consumed in accordance with some embodiments of the invention. It will be evident to one skilled in the art that the process described by the pseudocode in FIG. 6 may be implemented in any number of programming languages and a variety of different hardware, and that the style and format should not be construed as limiting, but rather as a general template of the steps and procedures that would be consistent with code used to implement some embodiments of this invention.

At line 601, control circuitry 304 runs a subroutine to initialize variables and prepare to generate, based on an available video stream, a video stream that corresponds to a camera angle when a media asset is consumed, which begins on line 605. For example, in some embodiments control circuitry 304 may copy instructions from a non-transitory storage medium (e.g., storage device 308) into RAM or into the cache for processing circuitry 306 during the initialization stage. Additionally, in some embodiments the value of the corresponding camera angle being used for comparison, or a tolerance level for determining if two values are essentially equivalent, may be retrieved, set, and stored at 601.

At line 605, control circuitry 304 receives instances of camera angle of an available video stream. In some embodiments these instances may be retrieved from memory. Control circuitry 304 may receive instances of camera angle of an available video stream by receiving, for example, a pointer to an array of values of camera angles of available video streams. In another example, control circuitry 304 may receive an object of a class, such as an iterator object containing elements of a camera angle of an available video stream.

At line 606, control circuitry 304 iterates through the various instances of camera angle of an available video stream; if only a single instance is available, the loop will only execute once. This loop may be implemented in multiple fashions depending on the choice of hardware and software language used to implement the process of FIG. 6; for example, this may be implemented as part of a "for" or "while" loop.

At line 607, control circuitry 304 stores the value of the camera angle of the available video stream into a temporary variable "A." In some embodiments the value of the camera angle of the available video stream will be stored as part of a larger data structure or class, and the value of camera angle of the available video stream may be obtained through appropriate accessor methods. In some embodiments, the camera angle of the available video stream may be converted from a string or other non-numeric data type into a numeric data type by means of an appropriate hashing algorithm. In some embodiments, control circuitry 304 may call a function to perform a comparison of the camera angle of the available video stream to the corresponding camera angle. In some embodiments, the camera angle of an available video stream may be encoded as a primitive data structure, and rather than using a temporary variable, the camera angle of an available video stream may be directly used in the comparison at line 609.

At line 608, control circuitry 304 stores the value of the corresponding camera angle into a temporary variable "B." Similar to the camera angle of the available video stream, in some embodiments, the value of the corresponding camera angle will be stored as part of a larger data structure or class, and the value of the corresponding camera angle may be obtained through accessor methods. In some embodiments the corresponding camera angle may be converted from a string or other non-numeric data type into a numeric data type by means of an appropriate hashing algorithm, or the corresponding camera angle may be a primitive data structure, and may be directly used in the comparisons at line 609.

At line 609, control circuitry 304 compares the value of A to the value of B to see if they are essentially equivalent. This is achieved by subtracting the value of B from A, taking the absolute value of the difference, and then comparing the absolute value of the difference to a predetermined tolerance level. In some embodiments the tolerance level may be a set percentage of either A or B. In some embodiments the tolerance level may be a fixed number. For example, setting the tolerance level to a set multiple of machine epsilon may allow for the process to account for small rounding errors that may result from the use of floating point arithmetic. In some embodiments the tolerance level may be set to zero, or the condition inside the IF statement may be replaced with a strict equivalence between A and B.

If the value of A and the value of B are essentially equivalent, meaning that the value of the camera angle of the available video stream matches the value of the corresponding camera angle, then the process 600 proceeds to line 610. At line 610, control circuitry 304 execute a subroutine to generate a video stream based on the available video stream whose value of the camera angle matches the value of the corresponding camera angle.

After control circuitry 304 executes a subroutine to generate a video stream based on the available video stream whose value of the camera angle matches the value of the corresponding camera angle, at line 611, control circuitry 304 will cause the process to exit the iteration loop that started at line 606.

At line 613, control circuitry 304 runs a termination subroutine after the process has performed its function. For example, in some embodiments control circuitry 304 may destruct variables, perform garbage collection, free memory or clear the cache of processing circuitry 306.

It will be evident to one skilled in the art that process 600 described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after line 610 to speed operation, or the conditional statements may be replaced with a case-switch. In some embodiments, rather than iterating over all instances of camera angle of an available video stream at step 506, in some embodiments the code may be rewritten so control circuitry 304 is instructed to evaluate multiple instances of camera angle of an available video stream simultaneously on a plurality of processors or processor threads, lowering the number of iterations needed and potentially speeding up computation time.

Figure 7:
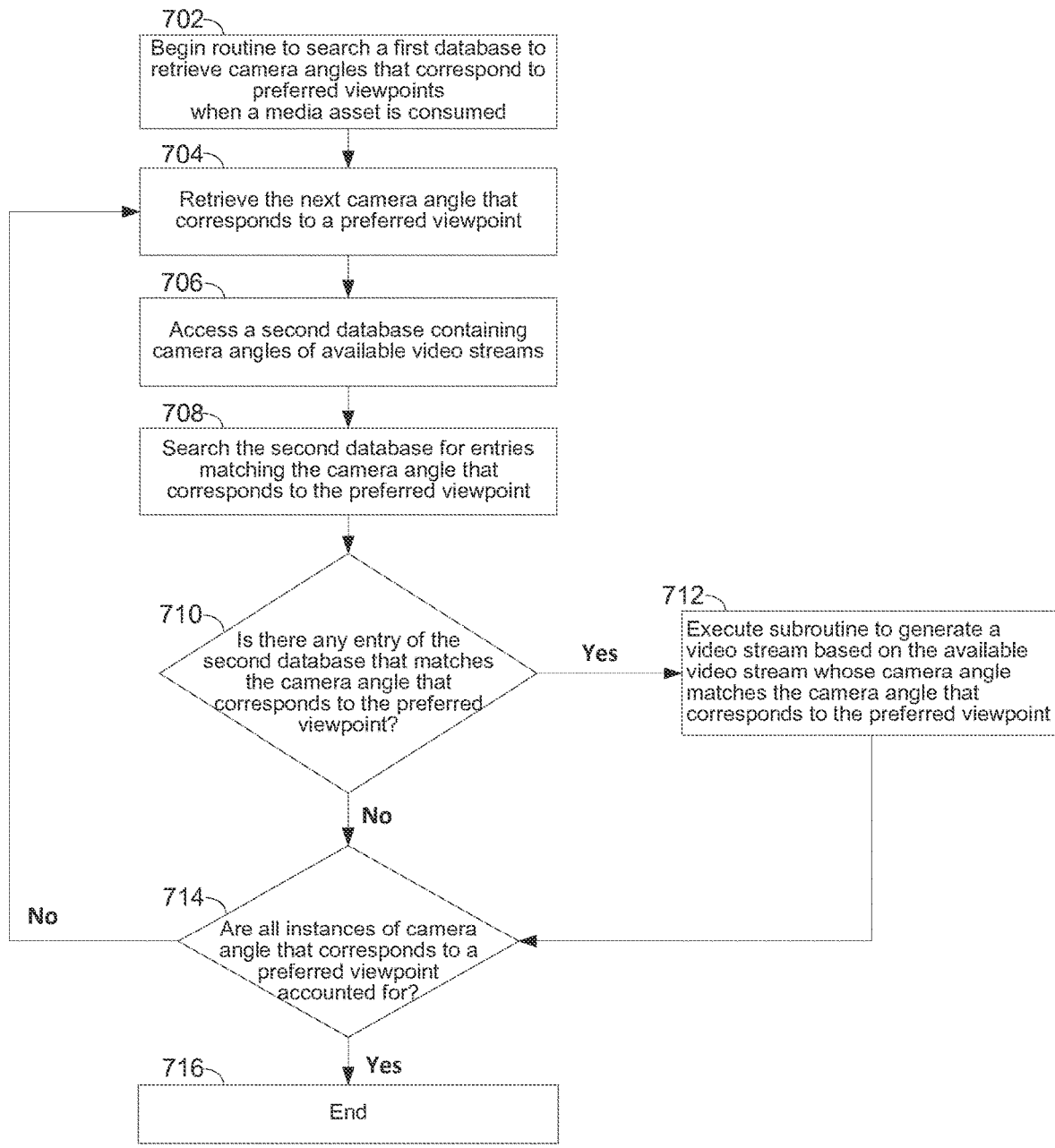
FIG. 7 is a flowchart of an illustrative process for generating a video stream that corresponds to a camera angle corresponding to a preferred viewpoint in accordance with some embodiments of the disclosure.

FIGS. 7 and 8 present a process implemented on control circuitry (e.g., control circuitry 304) to search a first database to retrieve camera angles that correspond to preferred viewpoints by using a second database containing camera angles of available video streams in accordance with some embodiments of the invention. Similar to the process described by FIGS. 5 and 6, in some embodiments this process may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes a process implemented on control circuitry (e.g., control circuitry 304) to search a first database to retrieve camera angles that correspond to preferred viewpoints in accordance with some embodiments of the invention.

At step 702, control circuitry 304 searches a first database to retrieve camera angles that correspond to preferred viewpoints when a media asset is consumed. In some embodiments, this may be done either directly or indirectly in response to a user action or input (e.g., from signals received by control circuitry 304 or user input interface 310.)

At step 704, control circuitry 304 proceeds to retrieve the next instance of camera angle that corresponds to a preferred viewpoint from memory. In some embodiments control circuitry 304 may retrieve a single primitive data structure that represents the value of camera angle that corresponds to a preferred viewpoint. In some embodiments control circuitry 304 may retrieve the value from a larger class or data structure.

At step 706, control circuitry 304 accesses a second database containing camera angles of available video streams. In some embodiments, this database may be stored locally (e.g., on storage device 308) prior to beginning process 700. In some embodiments the database may also be accessed by using communications circuitry to transmit information across a communications network (e.g., communications network 414) to a database implemented on a remote storage device (e.g., media guidance data source 418).

At step 708, control circuitry 304 searches the second database tables for entries matching the camera angle that corresponds to the preferred viewpoint. In some embodiments this may be done by comparing an identifier, for example a string or integer representing the camera angle that corresponds to the preferred viewpoint, that matches the types of identifiers used inside the database. In some embodiments control circuitry 304 may submit a general query to the database for table entries matching the camera angle that corresponds to the preferred viewpoint, and control circuitry 304 may receive a list of indices or a data structure containing a portion of the database contents. In some embodiments the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the process of FIG. 7 may be implemented using multiple independent or cross-referenced databases.

At step 710, control circuitry 304 determines if there is any database entry matching the camera angle that corresponds to the preferred viewpoint. In some embodiments control circuitry 304 may receive a signal from the database indicating that there are no matching entries. In some embodiments control circuitry 304 may instead receive a list of indices or data structures with a NULL or dummy value. If control circuitry 304 identifies that there are database entries matching the camera angle that corresponds to the preferred viewpoint, process 700 proceeds to step 712; otherwise process 700 proceeds to step 714.

At step 712, control circuitry 304 executes subroutine to generate a video stream based on the available video stream whose camera angle matches the camera angle that corresponds to the preferred viewpoint. Afterwards, process 700 proceeds to step 714 where control circuitry 304 determines if all instances of camera angle that corresponds to a preferred viewpoint are accounted for and if further iterations are needed. If further iterations are needed process 700 will loop back to step 704 where control circuitry 304 will retrieve the next instance of camera angle that corresponds to a preferred viewpoint. If no further iterations are needed process 700 will proceed to step 716.

At step 716, control circuitry 304 runs a termination subroutine after process 700 has performed its function.

It is contemplated that the descriptions of FIG. 7 may be used with any other embodiment of this invention. In addition, the descriptions described in relation to process 700 of FIG. 7 may be done in parallel to further the purposes of this invention. For example, control circuitry 304 may submit multiple queries to the database in parallel, or it may submit multiple queries to a plurality of similar databases in order to reduce lag and speed the execution of process 700. Furthermore, it should be noted that the process of FIG. 7 may be implemented on a combination of appropriately configured software and hardware, and that any of the devices or equipment discussed in relation to FIGS. 3-4 could be used to implement one or more portions of process 700.

The pseudocode in FIG. 8 describes an process to search a first database to retrieve camera angles that correspond to preferred viewpoints when a media asset is consumed in accordance with some embodiments of the invention. It will be evident to one skilled in the art that process 800 described by the pseudocode in FIG. 8 may be implemented in any number of programming languages and a variety of different hardware, and that the style and format should not be construed as limiting, but rather a general template of the steps and procedures that would be consistent with code used to implement some embodiments of this invention.

At line 801, control circuitry 304 runs a subroutine to initialize variables and prepare to search a first database to retrieve camera angles that correspond to preferred viewpoints when a media asset is consumed, which begins on line 805. For example, in some embodiments control circuitry 304 may copy instructions from non-transitory storage medium (e.g., storage device 308) into RAM or into the cache for processing circuitry 306 during the initialization stage.

At line 805, control circuitry 304 receives instances of camera angle that corresponds to a preferred viewpoint. In some embodiments these instances may be retrieved from memory.

At line 806, control circuitry 304 iterates through the various instances of camera angle that corresponds to a preferred viewpoint. If only a single instance is available, the loop will only execute once. This loop may be implemented in multiple fashions depending on the choice of hardware and software language used to implement the process of FIG. 8; for example, this may be implemented as part of a "for" or "while" loop, in some programming languages. In some embodiments, it may be convenient to store the instances of camera angle that corresponds to a preferred viewpoint in a single class or encapsulated data structure that will perform the loop as part of an internal method.

At line 807, control circuitry 304 queries a database for entries matching the camera angle that corresponds to a preferred viewpoint. Depending on how the database is implemented and how the camera angle that corresponds to a preferred viewpoint is stored, an intermittent step may be required to convert the camera angle that corresponds to a preferred viewpoint into a form consistent with the database. For example, the camera angle that corresponds to a preferred viewpoint may be encoded into a string or an integer using an appropriate hashing algorithm prior to being transmitted to the database by control circuitry 304 as part of a query. In some embodiments, the camera angle that corresponds to a preferred viewpoint may be encoded as a primitive data structure, and control circuitry 304 may submit camera angle that corresponds to a preferred viewpoint as a query to the database directly. After querying the database, control circuitry 304 may receive a set of database entries matching the camera angle that corresponds to a preferred viewpoint. In some embodiments, control circuitry 304 may receive these entries in the form of a data-structure, a set of indices of the database, or a set of indices of another cross-referenced database.

At line 808, control circuitry 304 will determine if there is any database entry matching the camera angle that corresponds to a preferred viewpoint. In some embodiments, control circuitry 304 may determine this by checking if the database returned an empty data structure or a NULL value in response to the query in line 807. If there are matching database entries the process proceeds to line 809.

At line 809, control circuitry 304 executes a subroutine to generate a video stream based on the available video stream whose camera angle matches the camera angle that corresponds to the preferred viewpoint.

At line 811, control circuitry 304 executes a termination subroutine after the process has performed its function and all instances of camera angle that corresponds to a preferred viewpoint have been processed and checked against the database. For example, in some embodiments control circuitry 304 may destruct variables, perform garbage collection, free memory or clear the cache of processing circuitry 306.

It will be evident to one skilled in the art that process 800 described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 304 is instructed to evaluate multiple instances of camera angle that corresponds to a preferred viewpoint and submit multiple database queries simultaneously using a plurality of processors or processor threads. It is also understood that although we may describe control circuitry 304 interacting with a single database, this is only a single embodiment described for illustrative purposes, and the process of FIG. 8 may be implement using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

Figure 9:
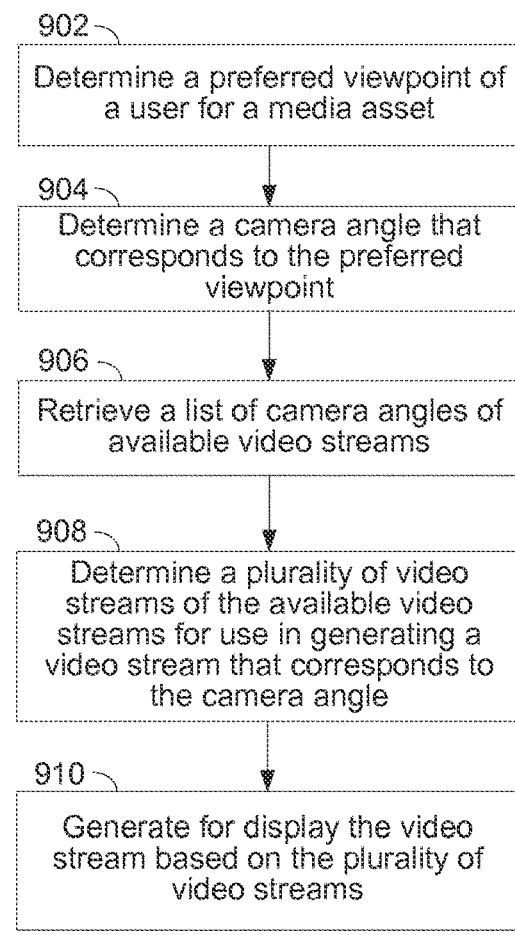
FIG. 9 is a flowchart of an illustrative process for generating for display the video stream based on the plurality of video streams in accordance with some embodiments of the disclosure.

FIG. 9 is a flowchart of an illustrative process for generating for display a video stream based on the plurality of video streams. It should be noted that process 900 or any step thereof could be performed on, or provided by, any of the devices shown in FIGS. 3-4. For example, process 900 may be executed by control circuitry 304 (FIG. 3) as instructed by a media guidance application implemented on user equipment 402, 404, and/or 406 (FIG. 4) in order to generate for display a video stream based on the plurality of video streams. In addition, one or more steps of process 900 may be incorporated into or combined with one or more steps of any other process or embodiment (e.g., FIGS. 5-8).

At step 902, the media guidance application determines (e.g., via control circuitry 304 (FIG. 3)) a preferred viewpoint of a user for a media asset (e.g., from storage 308 (FIG. 3), from a user's entry, and/or from any location accessible via communications network 414 (FIG. 4)). For example, the media guidance application may retrieve a user profile from memory, in which the user profile provides information about the user. For example, information in the user profile may indicate the user's usage frequencies of different viewpoints used in the past. The media guidance application may process this information to determine a preferred viewpoint.

As another example, the media guidance application may determine the preferred viewpoint based on data mined from social media that is accessible via communications network 414 (FIG. 4)). For example, the media guidance application determines (e.g., via control circuitry 304 (FIG. 3)) the preferred viewpoint based on, for example, data gathered from a popular web forum dedicated to professional hockey. In that case, based on the pertinent data from hockey web forum that are analyzed by the media guidance application (e.g., via control circuitry 304 (FIG. 3)), it determines that the preferred viewpoint to view a hockey game taking place in a particular hockey arena is from any of the four corners of the ice rink.

At step 904, the media guidance application determines (e.g., via control circuitry 304 (FIG. 3)) a camera angle that corresponds to the preferred viewpoint. For example, the media guidance application may access (e.g., via control circuitry 304 (FIG. 3)) a database (e.g., from storage 308 (FIG. 3), and/or from any location accessible via communications network 414 (FIG. 4)) to determine the camera angle corresponding to the preferred viewpoint. For example, a database (e.g., from storage 308 (FIG. 3), and/or from any location accessible via communications network 414 (FIG. 4)) contains a list of available camera angles corresponding to preferred viewpoints, and the media guidance application searches (e.g., via control circuitry 304 (FIG. 3)) in the database tables for a camera angle that corresponds to the preferred viewpoint.

At step 906, the media guidance application retrieves (e.g., via control circuitry 304 (FIG. 3)) a list of camera angles (e.g., retrieved from storage 308 (FIG. 3) and/or any location accessible via communications network 414 (FIG. 4)) of available video streams. For example, a database of all available video streams along with the corresponding camera angles exists (e.g., from storage 308 (FIG. 3), and/or from any location accessible via communications network 414 (FIG. 4)). Each available video stream listed in the database may have one corresponding camera angle. The media guidance application may access the database to retrieve each available video stream and its corresponding camera angle.

At step 908, the media guidance application determines (e.g., via control circuitry 304 (FIG. 3)) a plurality of video streams of the available video streams for use in generating a video stream that corresponds to the camera angle. For example, there are four available video streams captured for a particular tennis match, and each video stream is transmitted with the information of its corresponding camera angle from which it was captured. The information on each of the four camera angles for the four video streams is stored in a database (e.g., from storage 308 (FIG. 3)). After accessing the database and retrieving information on the four camera angles, the media guidance application determines (e.g., via control circuitry 304 (FIG. 3)) that only the two camera angles (e.g., from storage 308 (FIG. 3)) of the video streams captured from behind the two base lines are pertinent because only these two camera angles match the desired camera angle that corresponding to the user's preferred viewpoint.

At step 910, the media guidance application generates (e.g., via control circuitry 304 (FIG. 3)) for display (e.g., via Display 312 (FIG. 3)) the video stream based on the plurality of video streams. Continuing on from the previous example, the media guidance application generates (e.g., via control circuitry 304 (FIG. 3)) the video stream by combining selected portions of the two video streams (e.g., from storage 308 (FIG. 3), and/or from any location accessible via communications network 414 (FIG. 4)) captured from behind the base lines of the tennis court. At a given time, the portions from the two video streams are selected by the media guidance application (e.g., via control circuitry 304 (FIG. 3)) to be added to the generated video stream based on, for example, which one provides a more focused and sharp view on the tennis ball as it moves in the court.

Figure 10:
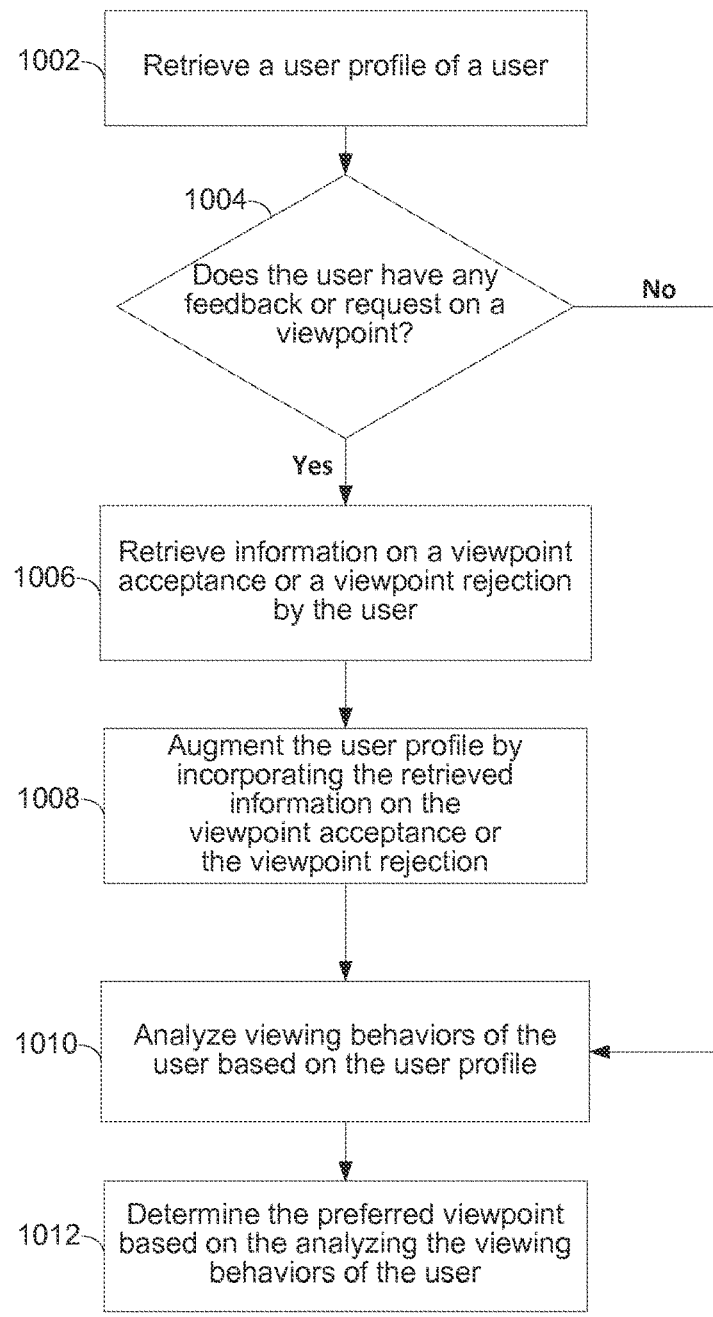
FIG. 10 is a flowchart of an illustrative process for determining the preferred viewpoint based on analyzing the viewing behaviors of the user.

FIG. 10 is a flowchart of an illustrative process for determining the preferred viewpoint based on analyzing the viewing behaviors of the user. In some embodiments, the viewing behaviors may have been accumulated over time. It should be noted that process 1000 or any step thereof could be performed on, or provided by, any of the devices shown in FIGS. 3-4. For example, process 1000 may be executed by control circuitry 304 (FIG. 3) as instructed by a media guidance application implemented on user equipment 402, 404, and/or 406 (FIG. 4) in order to generate for display a video stream based on the plurality of video streams. In addition, one or more steps of process 1000 may be incorporated into or combined with one or more steps of any other process or embodiment (e.g., FIGS. 5-8).

At step 1002, the media guidance application retrieves (e.g., via control circuitry 304 (FIG. 3)) a user profile of a user (e.g., from storage 308 (FIG. 3) or from a location accessible via communications network 414 (FIG. 4)). For example, the media guidance application may retrieve a user profile from memory, in which the user profile provides information about the user. For example, information in the user profile may indicate the user's usage frequencies of different viewpoints used in the past, viewing patterns, which viewpoints have been explicitly accepted, and which viewpoints have been explicitly rejected.

At step 1004, the media guidance application checks if the user has provided (e.g., via control circuitry 304 (FIG. 3)) any feedback or request on a viewpoint that may not have been incorporated into the user profile. For example, a user may frequently have switched away from a specific viewpoint when viewing a particular type of TV program, which may result in a feedback that this user does not like this specific viewpoint (a rejection) for this particular type of TV program. As another example, a user may have explicitly indicated that she does not like a particular viewpoint, which may result in another form of feedback. Further, a user may also have explicitly indicated that she likes a specific viewpoint. In that case, this is a request on a viewpoint. In the event where the user has not provided any feedback or request on a viewpoint, process 1000 will proceed to step 1010.

At step 1006, the media guidance application retrieves (e.g., via control circuitry 304 (FIG. 3)) information on a viewpoint acceptance or a viewpoint rejection by the user. For example, a user may have provided feedback to the media guidance application that she did not like a viewpoint that was offered to her, and wanted to override that viewpoint by another viewpoint. Based on this feedback, the media guidance application may record in the user profile that the offered viewpoint should be avoided in the future. As another example, a user may have explicitly requested a viewpoint to use for a particular media asset. In that case, the media guidance application may record in the user profile that the requested viewpoint may be a choice for the preferred viewpoint for this particular media asset in the future.

At step 1008, the media guidance application augments (e.g., using control circuitry 304 (FIG. 3)) the retrieved user profile by incorporating into it the retrieved information on the viewpoint acceptance or viewpoint rejection. For example, the media guidance application may expand an entry in the user profile that contains all viewpoints to avoid for a particular media asset to include the new viewpoint that was rejected by the user. Control circuitry 304 (FIG. 3) may allocate more memory to accommodate this expansion. As another example, the media guidance application may expand an entry of the user profile that contains all preferred viewpoints for a particular media asset to include the new viewpoint that was accepted by the user.

At step 1010, the media guidance application analyzes (e.g., using control circuitry 304 (FIG. 3)) viewing behaviors of the user based on the current user profile. For example, the media guidance application may detect (e.g., using control circuitry 304 (FIG. 3)) based on the retrieved user profile (e.g., from storage 308 (FIG. 3), and/or from any location accessible via communications network 414 (FIG. 4)) that the user may always switch to a particular viewpoint that provides a zoomed-in view on the home team quarterback player whenever he is in possession of the football during an NFL football.

At step 1012, the media guidance application determines (e.g., via control circuitry 304 (FIG. 3)) the preferred viewpoint based on the analysis of the viewing behaviors of the user. Continuing with the previous example using an NFL football game, based on the result of the analysis by the media guidance application, it may determine that the preferred viewpoint for the user to view an NFL football game when the home team quarterback player is in possession of the football is the particular zoomed-in viewpoint on the home team quarterback player. Further, a determined preferred viewpoint may be stored as part of the user profile (e.g., in storage 308 (FIG. 3), and/or in any location accessible via communications network 414 (FIG. 4)) so that the user profile can expand with information and knowledge for future uses.

It is contemplated that the steps or descriptions of FIGS. 9 and 10 may be used with any other embodiment of this disclosure. In addition, the steps and descriptions described in relation to FIGS. 9 and 10 may be done in parallel to further the purposes of this disclosure. For example, some of these steps may be performed in parallel or substantially simultaneously to reduce lag or increase the speed of the system or method. Furthermore, it should be noted that any of the devices or equipment discussed in relation to FIGS. 3-4 could be used to perform one or more of the steps in FIGS. 9 and 10.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing custom viewpoints, the method comprising:
   determining a preferred camera angle for a media asset based on a user preference;
   retrieving a list of camera angles of cameras that provide video streams for the media asset;

determining, based on the list of camera angles, that none of the cameras is positioned according to the preferred camera angle;

determining a plurality of video streams from the video streams that can be combined to correspond to the preferred camera angle;

extracting simultaneously acquired frames from the determined plurality of video streams; and generating for display a virtual video stream corresponding to the preferred camera angle by combining the simultaneously acquired frames from the determined plurality of video streams into composite images, wherein the virtual video stream corresponding to the preferred camera angle is generated when none of the cameras is positioned according to the preferred camera angle.

2. The method of claim 1, wherein generating for display the virtual video stream comprises generating the composite images based on data from the determined plurality of video streams.

3. The method of claim 2, further comprising:

identifying a common viewpoint selected by the user while previously accessing a plurality of media assets, wherein the common viewpoint is the same for each of the plurality of media assets;

determining a preferred viewpoint of the user for a media asset based on the common viewpoint selected by the user while previously accessing the plurality of media assets; and determining that the preferred camera angle corresponds to the preferred viewpoint, wherein the preferred viewpoint is determined based on a user input received after the media asset has been entirely recorded, and wherein each of the plurality of media assets have a similar title.

4. The method of claim 2, wherein generating for display the virtual video stream further comprises:

generating a model of an object based on the determined plurality of video streams;

selecting a portion of the model that corresponds to the camera angle; and generating for display the video stream based on the portion.

5. The method of claim 2, further comprising:

determining a preferred viewpoint; and determining that the preferred camera angle corresponds to the preferred viewpoint, wherein determining the preferred viewpoint, comprises:

retrieving a user profile of the user that indicates previous viewpoints used by the user;

ranking the previous viewpoints based on a number of instances or a length of time that the user has used each of the previous viewpoints; and selecting a previous viewpoint as the preferred viewpoint based on the ranking.

6. The method of claim 2, further comprising:

determining a preferred viewpoint; and determining that the preferred camera angle corresponds to the preferred viewpoint, wherein determining the preferred viewpoint comprises:

retrieving user profiles of multiple users that indicate previous viewpoints used by the multiple users;

ranking the previous viewpoints based on an aggregated number of instances or an aggregated length of time that the users have used each of the previous viewpoints; and selecting a previous viewpoint as the preferred viewpoint based on the ranking.

7. The method of claim 2, further comprising:

determining a preferred viewpoint; and determining that the preferred camera angle corresponds to the preferred viewpoint, wherein determining the preferred viewpoint, comprises:

retrieving a user profile of the user;

retrieving information on a viewpoint acceptance or a viewpoint rejection by the user;

augmenting the user profile by incorporating the retrieved information on a viewpoint acceptance or a viewpoint rejection;

analyzing viewing behaviors of the user based on the user profile; and determining the preferred viewpoint based on the analyzing the viewing behaviors of the user.

8. The method of claim 2, further comprising:

receiving a user input requesting a new viewpoint while generating for display the video stream;

determining a new camera angle that corresponds to the new viewpoint;

retrieving the list of camera angles of available video streams;

determining a new plurality of video streams of the available video streams for use in generating a new video stream that corresponds to the new camera angle; and generating for display the new video stream based on the new plurality of video streams.

9. The method of claim 2, further comprising:

determining a preferred viewpoint; and determining that the preferred camera angle corresponds to the preferred viewpoint, wherein determining that the camera angle corresponds to the preferred viewpoint, comprises:

inputting the preferred viewpoint into a database listing locations corresponding to preferred viewpoints to determine a location corresponding to the preferred viewpoint; and inputting the location corresponding to the preferred viewpoint into a database listing camera angles corresponding to locations to determine the camera angle that corresponds to the preferred viewpoint.

10. The method of claim 1, wherein generating for display the virtual video stream by combining the simultaneously acquired frames from the determined plurality of video streams into the composite images comprises:

determining respective relevant portions of each of the simultaneously acquired frames; and generating the composite images by combining the respective relevant portions.

11. A system for providing custom viewpoints, the system comprising:

storage circuitry configured to store a list of camera angles of cameras that provide video streams for a media asset; and control circuitry configured to:

determine a preferred camera angle for a media asset based on a user preference;

retrieve the list of camera angles of the cameras that provide the respective video streams for the media asset;

determine, based on the list of camera angles, that none of the cameras is positioned according to the preferred camera angle;

determine a plurality of video streams from the video streams that can be combined to correspond to the preferred camera angle;

extract simultaneously acquired frames from the determined plurality of video streams; and generate for display a virtual video stream corresponding to the preferred camera angle by combining the simultaneously acquired frames from the determined plurality of video streams into composite images, wherein the virtual video stream corresponding to the preferred camera angle is generated when none of the cameras is positioned according to the preferred camera angle.

12. The system of claim 11, wherein the control circuitry configured to generate for display the virtual video stream is further configured to generate the composite images based on data from the determined plurality of video streams.

13. The system of claim 12, wherein the control circuitry is further configured to:

identify a common viewpoint selected by the user while previously accessing a plurality of media assets, wherein the common viewpoint is the same for each of the plurality of media assets;

determine a preferred viewpoint of the user for a media asset based on the common viewpoint selected by the user while previously accessing the plurality of media assets; and determine that the preferred camera angle corresponds to the preferred viewpoint wherein the preferred viewpoint is determined based on a user input received after the media asset has been entirely recorded, and wherein each of the plurality of media assets have a similar title.

14. The system of claim 12, wherein the control circuitry configured to generate for display the virtual video stream is further configured to:

generate a model of an object based on the determined plurality of video streams;

select a portion of the model that corresponds to the camera angle; and generate for display the video stream based on the portion.

15. The system of claim 12, wherein the control circuitry is further configured to:

determine a preferred viewpoint; and determine that the preferred camera angle corresponds to the preferred viewpoint, wherein the control circuitry configured to determine the preferred viewpoint by:

retrieving a user profile of the user that indicates previous viewpoints used by the user;

ranking the previous viewpoints based on a number of instances or a length of time that the user has used each of the previous viewpoints; and selecting a previous viewpoint as the preferred viewpoint based on the ranking.

16. The system of claim 12, wherein the control circuitry is further configured to:

determine a preferred viewpoint; and determine that the preferred camera angle corresponds to the preferred viewpoint, wherein the control circuitry configured to determine the preferred viewpoint, by:

retrieving user profiles of multiple users that indicate previous viewpoints used by the multiple users;

ranking the previous viewpoints based on an aggregated number of instances or an aggregated length of time that the users have used each of the previous viewpoints; and selecting a previous viewpoint as the preferred viewpoint based on the ranking.

17. The system of claim 12, wherein the control circuitry is further configured to:

determine a preferred viewpoint; and determine that the preferred camera angle corresponds to the preferred viewpoint, wherein the control circuitry configured to determine the preferred viewpoint, by:

retrieving a user profile of the user;

retrieving information on a viewpoint acceptance or a viewpoint rejection by the user;

augmenting the user profile by incorporating the retrieved information on a viewpoint acceptance or a viewpoint rejection;

analyzing viewing behaviors of the user based on the user profile; and determining the preferred viewpoint based on the analyzing the viewing behaviors of the user.

18. The system of claim 12, wherein the control circuitry is further configured to:

receive a user input requesting a new viewpoint while generating for display the video stream;

determine a new camera angle that corresponds to the new viewpoint;

retrieve the list of camera angles of available video streams;

determine a new plurality of video streams of the available video streams for use in generating a new video stream that corresponds to the new camera angle; and generate for display the new video stream based on the new plurality of video streams.

19. The system of claim 12, wherein the control circuitry is further configured to:

determine a preferred viewpoint; and determine that the preferred camera angle corresponds to the preferred viewpoint, wherein the control circuitry configured to determine that the camera angle corresponds to the preferred viewpoint, by:

inputting the preferred viewpoint into a database listing locations corresponding to preferred viewpoints to determine a location corresponding to the preferred viewpoint; and inputting the location corresponding to the preferred viewpoint into a database listing camera angles corresponding to locations to determine the camera angle that corresponds to the preferred viewpoint.

20. The system of claim 11, wherein the control circuitry configured to generate the virtual video stream by combining the simultaneously acquired frames from the determined plurality of video streams into the composite images is further configured to:

determine respective relevant portions of each of the simultaneously acquired frames; and generate the composite images by combining the respective relevant portions.

* * * * *